United States Patent
Reyes et al.

(10) Patent No.: US 9,745,506 B2
(45) Date of Patent: Aug. 29, 2017

(54) TREATMENT FLUIDS FOR USE IN REMOVING ACID-SOLUBLE MATERIALS IN SUBTERRANEAN FORMATIONS

(71) Applicant: Halliburton Energy Services, Inc., Houston, TX (US)

(72) Inventors: Enrique Antonio Reyes, Tomball, TX (US); Aaron M. Beuterbaugh, Spring, TX (US); Alyssa Lynn LaBlanc, Humble, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/100,863

(22) PCT Filed: Jun. 1, 2015

(86) PCT No.: PCT/US2015/033537
§ 371 (c)(1),
(2) Date: Jun. 1, 2016

(87) PCT Pub. No.: WO2016/195653
PCT Pub. Date: Dec. 8, 2016

(65) Prior Publication Data
US 2017/0130122 A1    May 11, 2017

(51) Int. Cl.
*C09K 8/68* (2006.01)
*E21B 37/06* (2006.01)
(Continued)

(52) U.S. Cl.
CPC ............... *C09K 8/72* (2013.01); *C09K 8/035* (2013.01); *C09K 8/42* (2013.01); *C09K 8/58* (2013.01); *E21B 43/25* (2013.01)

(58) Field of Classification Search
CPC .................................. E21B 33/06; E21B 37/08
See application file for complete search history.

(56) References Cited

U.S. PATENT DOCUMENTS

| 5,171,460 A | 12/1992 | Underdown |
| 6,130,351 A | 10/2000 | Stern et al. |
| (Continued) |

FOREIGN PATENT DOCUMENTS

| WO | 2009006326 A2 | 1/2009 | |
| WO | WO 2013/156813 | * 10/2013 | ............. A01N 41/04 |

OTHER PUBLICATIONS

International Search Report and Written Opinion received in corresponding International Application No. PCT/US2015/033537, dated Mar. 7, 2016.

*Primary Examiner* — Doug Hutton, Jr.
*Assistant Examiner* — Avi Skaist
(74) *Attorney, Agent, or Firm* — McDermott Will & Emery LLP (57) ABSTRACT

Treatment fluids comprising methane sulfonic acid (MSA) and fully protonated N-(phosphonomethyl)iminodiacetic acid (PMIDA) solubilized in the MSA. Methods including introducing the treatment fluids into a wellbore in a subterranean formation comprising acid-soluble material at a first treatment interval, and reacting the MSA and the PMIDA in the treatment fluid with the acid-soluble material at a temperature in the range of about 65° C. to about 210° C., wherein the reacting removes the acid-soluble material, thereby forming conductive channels in the subterranean formation.

20 Claims, 2 Drawing Sheets

(51) Int. Cl.
*C09K 8/72* (2006.01)
*C09K 8/035* (2006.01)
*C09K 8/58* (2006.01)
*C09K 8/42* (2006.01)
*E21B 43/25* (2006.01)

(56) References Cited

U.S. PATENT DOCUMENTS

| | | |
|---|---|---|
| 6,278,017 B1 | 8/2001 | Stern et al. |
| 6,631,764 B2 | 10/2003 | Parlar et al. |
| 7,638,469 B2 | 12/2009 | Heidenfelder et al. |
| 7,651,982 B2 | 1/2010 | Cassidy et al. |
| 7,753,123 B2 | 7/2010 | Fuller |
| 2008/0139412 A1* | 6/2008 | Fuller .............. C09K 8/52 507/219 |
| 2008/0200354 A1 | 8/2008 | Jones et al. |
| 2011/0079392 A1* | 4/2011 | Reyes .............. C09K 8/528 166/310 |
| 2013/0079260 A1 | 3/2013 | Frenier et al. |
| 2013/0269937 A1 | 10/2013 | Reyes |
| 2016/0160111 A1* | 6/2016 | Smith .............. E21B 37/06 166/304 |

* cited by examiner

TREATMENT FLUIDS FOR USE IN REMOVING ACID-SOLUBLE MATERIALS IN SUBTERRANEAN FORMATIONS

BACKGROUND

The embodiments herein relate generally to subterranean formation operations and, more particularly, to treatment fluids used in removing acid-soluble materials in subterranean formations.

Subterranean formations (e.g., hydrocarbon producing wells) are often stimulated by hydraulic fracturing treatments. In hydraulic fracturing treatments, a treatment fluid is pumped into a portion of a subterranean formation at a rate and pressure such that the subterranean formation breaks down and one or more fractures are formed. Typically, particulate solids are then deposited in the fractures. These particulate solids ("proppant particulates" or "proppant") serve to prevent the fractures from fully closing once the hydraulic pressure is removed by forming a proppant pack. As used herein, the term "proppant pack" refers to a collection of proppant particulates in a fracture. By keeping the fracture from fully closing, the proppant particulates aid in forming conductive paths through which fluids may flow.

Subterranean formations may additionally be stimulated by acid treatments ("acidizing"). Acidizing involves introducing an acidic fluid into the formation to dissolve acid-soluble materials that may clog or constrict formation channels, such as the conductive paths formed between proppant particulates in a proppant pack. Acidic fluids may remove or reduce gas hydrates, among other materials, thus allowing produced fluids from the formation to flow more readily or easily through the formation and into a wellbore for production. Acidizing may also facilitate the flow of injected treatment fluids from the wellbore into the formation, when it is desired. In some instances, hydraulic fracturing may be performed using an acidic treatment fluid ("acid fracturing").

Stimulation operations, and other subterranean formation operations, are designed to maximize production of fluids therefrom. Accordingly, creation of conductive channels in a formation at locations both in the near-wellbore region and far-field regions may be beneficial to increase fluid production. As used herein, the term "near-wellbore region," or simply "near-wellbore," refers to an annular volume of a subterranean formation penetrated by wellbore from the outer diameter of the wellbore extending radially inward from the wellbore and into the formation a distance of no greater than about 9 meters (30 feet). As used herein, the term "far-field region," or simply "far-field" refers to an annular volume of a subterranean formation penetrated by wellbore from the outer diameter of the wellbore extending radially inward beyond the near-wellbore region. Both the near-wellbore region and the far-field region may further be defined along a length of a fracture when formed or existing in a subterranean formation, without departing from the scope of the present disclosure. In some instances, acid fluids may become spent (i.e., weakened or exhausted such that it is no longer fully effective, if at all) prior to reaching the far-field region, thus failing to fully realize the conductivity potential of a stimulation treatment job.

BRIEF DESCRIPTION OF THE DRAWINGS

The following figures are included to illustrate certain aspects of the embodiments described herein, and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION

The embodiments herein relate generally to subterranean formation operations and, more particularly, to treatment fluids used in removing acid-soluble materials in subterranean formations.

Specifically, the embodiments described herein utilize a treatment fluid comprising methanesulfonic acid (MSA) as a transport medium for placing N-(phosphonomethyl Iminodiacetic acid (PMIDA) in fully protonated, unreacted form into a far-field region of a subterranean formation, including fractures therein, comprising acid-soluble material. Both the MSA and the PMIDA serve to solubilize the acid-soluble material, but the chemical properties of the two acids allows the PMIDA to be dissolved into the MSA such that the MSA first reacts with acid-soluble material in the near-wellbore region and beyond into the far-field region, in some cases, prior to the PMIDA reacting with the acid-soluble material in deeper portions of a subterranean formation. Specifically, the MSA dissolves the PMIDA and, due to the acidity of MSA (pKa of about 1.6 at a temperature of 25° C. in dimethyl sulfoxide, and a pKa of −1.9 at a temperature of 25° C. in water), the MSA first reacts with acid-soluble materials in a fracture, allowing the PMIDA to pass unreacted through the formation until the MSA is spent. The spent MSA causes the treatment fluid to increase in pH (become more basic) to the point of deprotonation of the PMIDA or beyond (four pKa values of 2.0, 2.6, 5.4, and 10.4 at a temperature of 25° C.) such that it becomes reactive with the acid-soluble materials in the fracture. The deprotonation of the PMIDA, such as at its lowest pKa, may further aid in increasing the pH of the treatment fluid to trigger deprotonation of the PMIDA at its higher pKa's, and so on (i.e., further deprotonation of the PMIDA continues to increase the pH of the fluid). Accordingly, the MSA acts both to remove acid-soluble material and as a transport medium to introduce unreacted PMIDA into deeper regions of a formation.

Reacting the PMIDA in deeper regions of the formation allows both far-field stimulation by creating conductive channels thereat from removal of the acid-soluble materials, as well as strategically placing the PMIDA in formation portions most suitable for scale prevention. As used herein, the term "removal of acid-soluble materials," and grammatical variants thereof, refers to dissolution (e.g., solubilization, bulk erosion, and the like) of acid-soluble materials upon contact with an acid (e.g., MSA and/or PMIDA) such that conductive channels are formed where the acid-soluble material once was. The term "removal of acid soluble materials," and grammatical variants thereof, does not imply 100% removal of such acid-soluble materials. As used herein, the term "conductive channel," and grammatical variants thereof, refers to any ablation or void formed in a subterranean formation through which produced fluids may flow. Such conductive channels may thus include wormholes and wormhole networks created in a formation or a fracture face, etching formed on a formation or fracture face (e.g., during acid-fracturing), holes, and the like, provided that they allow the flow of produced fluids therethrough and into a wellbore for collection at the surface either alone or in combination with other conductive channels (e.g., a channel network). As used herein, the term "fracture face," and grammatical variants thereof, refers to a surface of a fracture that is contacted with an introduced treatment fluid.

The embodiments of the present disclosure may advantageously utilize a MSA transport medium for deep stimulation of a formation using PMIDA, while the MSA transport medium itself also stimulates the formation at near-wellbore or further far-field regions until the MSA is spent and the PMIDA becomes deprotonated. Additionally, the MSA and PMIDA treatment fluids described herein have low health, safety, and environmental impact; are biodegradable; are organic and have reduced corrosion characteristics compared to typical acids (e.g., hydrochloric acid); are less aggressive (e.g., lessened tendency towards corrosion or towards damaging certain carbonate-containing formation) and thus easier to manage than typical acids (e.g., hydrochloric acid); are readily and commercially available at relatively low cost (e.g., are not short in supply); and require no alterations to existing pumping equipment. The MSA and PMIDA treatment fluids of the present disclosure may also be used in a variety of subterranean formation operations, as they exhibit high vapor pressure permitting use in open-air environments, low melting points (e.g., MSA may have a melting point of −54° C.) permitting use in cold weather operations, and high temperature stability permitting use in high temperature subterranean formations. PMIDA exhibits low water solubility but in combination with the high water solubility of MSA shows a co-solvent dependency for PMIDA for aqueous solvency. MSA additionally may be advantageously non-oxidizing, easy to handle, create no toxic fumes, have a low carbon content, odorless, colorless, biodegradable, free of nitrogen, free of phosphorous, free of halogens, resistant to hydrolysis, contribute minimally if at all to chemical oxygen demand, and rival certain traditional acids such as hydrochloric acid in removing acid-soluble material.

As mentioned previously, the MSA transport medium comprising PMIDA described herein may be used to strategically place the PMIDA in formation portions most suitable for scale prevention in deeper, far-field well regions. While scale prevention is preferred at all areas in a well, reducing or eliminating scale in far-field regions helps mitigate scale buildup and conglomeration where the "surface area" of drainage is the greatest. In such far-field regions, the scale becomes "concentrated" or "funneled down" thus causing excessive plugging compared to wellbore or near-wellbore regions. Additionally, the buildup of scale in the far-field region may occur due to water impeding into the formation system (e.g., a fracture) from surrounding formation sources (e.g., water reservoir, or trapped water), and such scale in the far-field region is beneficially reduced or eliminated using the embodiments described herein.

In some embodiments, the methods and compositions described herein may be with reference to particular subterranean formation operations (e.g., acidizing operations, acid-fracturing operations, and the like). However, the treatment fluids described herein may be used in any subterranean formation operation that may benefit their ability to remove acid-soluble material in a subterranean formation, particularly at far-field regions thereof. Such subterranean formation operations may include, but are not limited to, a drilling operation, a stimulation operation, an acidizing operation, an acid-fracturing operation, a sand control operation, a fracturing operation, a frac-packing operation, a gravel-packing operation, a workover operation, a gas-hydrate removal operation, a production operation, a remedial operation, an enhanced oil recovery operation, an injection operation, a formation damage reduction operation, a cementing operation, and the like, and any combination thereof.

One or more illustrative embodiments disclosed herein are presented below. Not all features of an actual implementation are described or shown in this application for the sake of clarity. It is understood that in the development of an actual embodiment incorporating the embodiments disclosed herein, numerous implementation-specific decisions must be made to achieve the developer's goals, such as compliance with system-related, lithology-related, business-related, government-related, and other constraints, which vary by implementation and from time to time. While a developer's efforts might be complex and time-consuming, such efforts would be, nevertheless, a routine undertaking for those of ordinary skill in the art having benefit of this disclosure.

It should be noted that when "about" is provided herein at the beginning of a numerical list, the term modifies each number of the numerical list. In some numerical listings of ranges, some lower limits listed may be greater than some upper limits listed. One skilled in the art will recognize that the selected subset will require the selection of an upper limit in excess of the selected lower limit. Unless otherwise indicated, all numbers expressing quantities of ingredients, properties such as molecular weight, reaction conditions, and so forth used in the present specification and associated claims are to be understood as being modified in all instances by the term "about."

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

The term "about" may refer to a +/−5% numerical range. Accordingly, unless indicated to the contrary, the numerical parameters set forth in the following specification and attached claims are approximations that may vary depending upon the desired properties sought to be obtained by the exemplary embodiments described herein. At the very least, and not as an attempt to limit the application of the doctrine of equivalents to the scope of the claim, each numerical parameter should at least be construed in light of the number of reported significant digits and by applying ordinary rounding techniques.

It should further be noted that, as used herein, the term "substantially" means largely, but not necessarily wholly.

While compositions and methods are described herein in terms of "comprising" various components or steps, the compositions and methods can also "consist essentially of" or "consist of" the various components and steps. When "comprising" is used in a claim, it is open-ended.

In some embodiments, the present disclosure provides a treatment fluid comprising MSA and fully protonated PMIDA, wherein the PMIDA is at least partially solubilized in the MSA. As used herein, the term "at least partially solubilized," and grammatical variants thereof, with reference to the PMIDA in the MSA refers to dissolution of at least about 5% weight per volume (w/v) of the PMIDA in the MSA at room temperature. As used herein, the term "room temperature" refers to about 15° C. to about 25° C. The remaining excess PMIDA may be suspended in the MSA when it is undergoing dynamic fluid flow at room temperature. As temperatures increase (e.g., as the treatment fluid is introduced into a subterranean formation and encounters downhole temperatures), the solubility of the PMIDA in the MSA increases, as discussed in greater detail below.

The solubility of the PMIDA in the MSA and the ability of both the MSA and the PMIDA to remove acid-soluble materials of the present disclosure synergistically operate to continuously remove acid-soluble materials at deeper far-field locations than traditional acid fluids, which may become spent prior to reaching such deep areas. Indeed, the solubility of PMIDA in MSA is substantially increased compared to its very low solubility in water (<0.5 grams per liter (g/L) at 25° C., with some increase with increasing temperatures), certain acids (e.g., hydrochloric acid, formic acid, and acetic acid), most organic solvents (e.g., acetone, methanol, ethanol, isopropyl alcohol, polar ethers, and high dielectric constant organic solvents), and aliphatic and aromatic solvents.

In some embodiments, the working temperature of the treatment fluids described herein are in the range of a lower limit of about 65° C., 70° C., 75° C., 80° C., 85° C., 90° C., 95° C., 100° C., 105° C., 110° C., 115° C., 120° C., 125° C., 130° C., 135° C., and 140° C. to an upper limit of about 210° C., 205° C., 200° C., 195° C., 190° C., 185° C., 180° C., 175° C., 170° C., 165° C., 160° C., 155° C., 150° C., 145° C., and 140° C. (equivalent to about 120° F. to about 410° F.), encompassing any value and subset therebetween. As used herein, the "working temperature" (or simply "temperature") with reference to the treatment fluids described herein refers to the temperature (+/−5° C.) in which PMIDA is at least partially solubilized, as described above, from a solid form into a liquid phase. Each of these values is critical to the embodiments of the present disclosure and may be dependent on a number of factors including, but not limited to, the desired solubility of the PMIDA (as opposed to suspension), the temperature or temperature range of the subterranean formation being treated, and the like. The working temperature of the treatment fluids may be achieved by any means, including, but not limited to, introduction of the treatment fluids into a subterranean formation (or a treatment zone therein) having the desired temperature, heating the treatment fluids to a desired temperature prior to their introduction into the subterranean formation, introduction of a downhole heating element that heats the treatment fluid in situ in the subterranean formation, and the like.

In the working temperature range of the treatment fluid, as described above, the PMIDA may be solubilized in the MSA of the treatment fluids described herein. In some embodiments, the PMIDA is about 5% w/v soluble at room temperature in a solution of about 70% MSA in an aqueous base fluid, described below. In other embodiments, higher w/v concentrations of PMIDA may be prepared using varied solutions of MSA alone or in combination with an aqueous base fluid, which will undergo different dissolution amounts depending on the working temperature of the treatment fluid. Each of these values is critical to the embodiments described herein and may depend on a number of factors including, but not limited to, the working temperature of the treatment fluid (e.g., the temperature or temperature range of the subterranean formation being treated), the amount of MSA in the treatment fluid relative to the PMIDA, the amount of PMIDA in the treatment fluid relative to the MSA, and the like.

Generally, the initial pH of the treatment fluid is less than about the pKa values of the PMIDA, or less than about 1.9 (e.g., less than about 1.9, less than about 1.8, less than about 1.6, less than about 1.4, less than about 1.2, less than about 1, less than about 0.8, less than about 0.6, less than about 0.4, less than about 0.2, or less than about 0.1). As used herein, the term "initial pH" of the treatment fluid refers to the pH of the treatment fluids prior to the MSA being completely spent. Accordingly, the initial pH may be the pH of the treatment fluid prior to its introduction into a formation or after sometime in a formation during which the MSA is being spent. At such low pH levels, the MSA will initially be protonated until it is spent and the pH of the treatment fluid rises to a pH of greater than about the pKa values of the PMIDA, or greater than about 2.0 (e.g., greater than about 3.0, greater than about 4.0, greater than about 5.0, greater than about 6.0, greater than about 7.0, greater than about 8.0, greater than about 9.0, greater than about 10.0, greater than about 11.0, greater than about 12.0, and greater than about 13.0). As the treatment fluid increases to a pH of above about 2.0, deprotonation of the PMIDA commences and continues to increase the pH of the treatment fluid, thus exceeding the higher pKa values of PMIDA. It is believed that below a pH value of about 2.0 (e.g., below about 1.9), PMIDA remains fully protonated and inactive for reacting with and removing acid-soluble materials.

Accordingly, as the treatment fluid is introduced into a subterranean formation, the MSA of the treatment fluid is protonated at pH ranges of less than about 1.9. As the treatment fluid is penetrated into the subterranean formation from a wellbore (i.e., starting at the near-wellbore region), the MSA reacts with and solubilizes (thus removing from the formation) at least a portion of acid-soluble materials therein. The treatment fluid continues to penetrate deeper into the formation and the PMIDA does not react with acid-soluble materials until the MSA is spent and the pH of the treatment fluid is thus elevated due to such spending above about 2.0. Thus, the PMIDA only reacts with acid-soluble materials in the formation after the MSA is spent and thus at deeper regions of the formation than the MSA. It will be appreciated that at a pH of between about 1.9 and 2.1, both the MSA and the PMIDA may be deprotonated simultaneously, as such pH is near their pKa's, without departing from the scope of the present disclosure. However, such dual reaction will be relatively brief as the pH continues to rise, favoring deprotonation of the PMIDA and having already exhausted all or most of MSA (i.e., spent the MSA). Moreover, regardless of any such overlap of deprotonation of the MSA and the PMIDA, the PMIDA necessarily still deprotonates and removes acid-soluble material(s) at a greater radial distance into the formation from the wellbore than the MSA, which is spent first.

The treatment fluid may be introduced into the subterranean formation at a desired treatment zone (i.e., portion of the subterranean formation, or portion of the length of the wellbore), and such introduction may be thereafter repeated at one or more additional treatment zones (including by use of diverting agents, either chemical or mechanical), without departing from the scope of the present disclosure.

The acid-soluble materials in the subterranean formation may include, but are not limited to, a carbonate material (e.g., calcium carbonate, magnesium carbonate, barium carbonate, iron(II) carbonate, calcite, calcium magnesium carbonate, and the like, and any combination thereof), scale, a sulfate material (e.g., strontium sulfate, barium sulfate, and the like, and any combination thereof), an iron oxide, a manganese oxide, and any combinations thereof), and any combination thereof. In some instances, the acid-soluble material may be mixed or layered with acid-insoluble materials.

The MSA for use in forming the treatment fluids described herein may generally have the formula of Structure I:

Structure I

The MSA may be present in the neutral form of Structure I in the treatment fluids of the present disclosure. In other embodiments, the MSA may be present in ester form (e.g., phosphate ester). In other embodiments, the MSA may be present in a metal salt form (e.g., cobalt salt, chromium (2+) salt, chromium (3+) salt, iron (2+) salt, iron (3+) salt, silver (1+) salt), but such metal salt form would result in a high pH that would require adjustment prior to its use as a treatment fluid described herein having a pH of less than about 1.9. Suitable commercially available MSA for use in the treatment fluids of the present disclosure may include, but are not limited to, LUTROPUR® MSA and LUTROPUR® MSA 100, available from BASF SE in Ludwishafen, Germany.

The PMIDA of the present disclosure for use in forming the treatment fluids described herein may generally have the formula of Structure II:

Structure II

In some embodiments, the PMIDA may be present in the neutral form of Structure II. In other embodiments, the PMIDA may be in a salt form, including an alkali metal salt form of PMIDA, an ammonium salt form of PMIDA, a quaternary ammonium salt form PMIDA, and any combination thereof. Like the metal salt form of MSA, the salt forms of PMIDA may also exhibit high pH values that would require adjustment prior to its use as a treatment fluid described herein having a pH of less than about 1.9.

In some embodiments, the PMIDA may be present in the treatment fluid in a ratio to the MSA (PMIDA:MSA) in an amount in the range of a lower limit of about 1:5, 2:6, 3:8, 9:21, and 18:37 to an upper limit of about 45:80, 36:69, 27:53, and 18:37, encompassing any value and subset therebetween. Each of these values is critical to the embodiments of the present disclosure and may depend on a number of factors including, but not limited to, the type of MSA selected, the type of PMIDA selected, the type of subterranean formation being treated, the amount of acid-soluble material in the subterranean formation, the temperature of the subterranean formation, the desired solubility of the acid-soluble material in the subterranean formation, and the like.

In some embodiments, the treatment fluids described herein may further comprise an aqueous base fluid, which may be used in some embodiments as a carrier fluid for the MSA, for example. Suitable aqueous base fluids may include, but are not limited to, fresh water, acidified water (e.g., water with an acid therein), salt water, seawater, brine (e.g., a saturated salt solution), an aqueous salt solution (e.g., a non-saturated salt solution), and any combination thereof. Aqueous carrier fluids may be obtained from any suitable source, provided that it does not contain in significant concentrations components that might adversely affect the stability and/or performance of the treatment fluid. In some instances, aqueous base fluid comprising salts may affect the acid reaction kinetics when certain acid-soluble materials are encountered. Accordingly, the combination of MSA, PMIDA, and a salt-comprising aqueous base fluid should be evaluated to ensure that the acids are capable of adequately removing the acid-soluble materials present in a subterranean formation to the extent desired.

In some embodiments, the aqueous base fluid may be present in the treatment fluids of the present disclosure in an amount in the range of from a lower limit of about 0.2%, 0.5%, 1%, 2%, 3%, 4%, 5%, 6%, 7%, 8%, 9%, 10%, 11%, 12%, 13%, 14%, and 15% to an upper limit of about 30%, 29%, 28%, 27%, 26%, 25%, 24%, 23%, 22%, 21%, 20%, 19%, 18%, 17%, 16%, and 15% by volume of the MSA in the treatment fluid, encompassing every value and subset therebetween. In some embodiments, commercially available MSA may be provided at a dilution in aqueous base fluid at a range provided above, without departing from the scope of the present disclosure. Each of these values is critical to the embodiments of the present disclosure and may depend on a number of factors including, but not limited to, the type of MSA selected, the type of PMIDA selected, the type and amount of acid-soluble material(s) in the subterranean formation being treated, and the like. Additionally, due to the low solubility of PMIDA in aqueous fluids, it can be assumed that with increasing amounts of aqueous base fluid in the treatment fluid, the amount of solubilized PMIDA in the treatment fluid will decrease.

In additional embodiments, the treatment fluids described herein may further comprise an additive including, but not limited to, a weighting agent, an inert solid, a fluid loss control agent, a salt, an emulsifier, a dispersion aid, a corrosion inhibitor, an emulsion thinner, an emulsion thickener, a viscosifying agent, a gelling agent, a surfactant, a particulate, a proppant, a gravel particulate, a lost circulation material, a foaming agent, a gas, a pH control additive, a breaker, a biocide, a crosslinker, a stabilizer, a chelating agent, a scale inhibitor, a gas hydrate inhibitor, a mutual solvent, an oxidizer, a reducer, a friction reducer, a clay stabilizing agent, silica scale control additive, a gel stabilizer, an anti-oxidant, a polymer degradation prevention additive, a relative permeability modifier, a defoaming agent, an antifoaming agent, an iron control agent, a particulate diverter, an acid, a catalyst, a flocculant, a scavenger (e.g., $H_2S$ scavengers, $CO_2$ scavengers or $O_2$ scavengers), a lubricant, a bridging agent, a solubilizer, a consolidating agent, a bactericide, and the like, and any combination thereof.

In some embodiments, the treatment fluids described herein are introduced into a wellbore in a subterranean formation comprising acid-soluble material(s). The MSA and the PMIDA react with the acid-soluble material to remove it from the subterranean formation and create conductive channels from where the acid-soluble material has been removed. As discussed previously, the MSA reacts prior to the PMIDA with the acid-soluble material and, thus, the PMIDA reacts with acid-soluble material at a greater distance into the formation from a face of the wellbore (i.e., at a greater distance extending radially into the formation from the wellbore, or the near-wellbore region) as compared to the MSA. That is, the PMIDA reacts with acid-soluble material in a far-field region of the subterranean formation from a face of the wellbore (i.e., away from the wellbore extending radially into the formation) as compared to the MSA, which reacts closer to the face of the wellbore or the near-wellbore region. In some instances, such radial penetration distances can be calculated by a treatment fluid volume relationship, in light of the porosity/permeability of the subterranean formation. That is, the formation properties and the amount of treatment fluid, as well as the rate and pressure of the introduced treatment fluid, impact the penetration of the treatment fluid and the radial distance of the formation having acid-soluble material that will react with the MSA or the PMIDA, or in some instances as described above both the MSA and PMIDA simultaneously (for a brief period, if at all). For example, the desired depth penetration may be calculated using the radial penetration into the formation by a treatment fluid volume (e.g., 50 gallons per foot (gal/ft), 100 gal/ft, 250 gal/ft, 500 gal/ft, and more if desired, and the like) when taking into account porosity and permeability of the formation.

In some embodiments, the treatment fluids described herein can be used in fracture acidizing operations of subterranean formations comprising an acid-soluble material(s). That is, in some embodiments, the treatment fluids described herein can be introduced to a subterranean formation at a rate and pressure sufficient to create or enhance a fracture therein (i.e., above the fracture gradient pressure of the formation). In such instances, the acid-soluble materials that are reacted with the MSA and PMIDA for removal may be located on the face of the fracture. The MSA and PMIDA may remove the acid-soluble materials as the fracture propagates, where the MSA reacts first with the acid-soluble materials and the PMIDA reacts with the acid-soluble materials at a greater distance along the length of the fracture away from the wellbore and into the far-field region. In other embodiments, the MSA and/or PMIDA may continue to react with the acid-soluble materials after the propagation of the fracture is complete, without departing from the scope of the present disclosure.

In some embodiments, the treatment fluids and methods described herein can be used in matrix acidizing operations of subterranean formations comprising an acid-soluble material(s). That is, in some embodiments, the treatment fluids described herein can be introduced to a subterranean formation below a fracture gradient pressure of the subterranean formation. In such instances, one or more fractures may already be present in the subterranean formation, or the matrix acidizing operation may be performed prior to or without forming fractures in the formation.

In some embodiments, prior to introducing the treatment fluids described herein into a subterranean formation, one or more pre-flush fluids may be first introduced into the subterranean formation. As used herein, the term "pre-flush fluid" refers to a fluid stage introduced into a subterranean formation before the treatment fluid(s) described herein. Pre-flush fluids may aid in removing debris from the formation, displacing reservoir fluids, preconditioning the formation for contact with the treatment fluids (e.g., the MSA, PMIDA, and any additives therein), and the like. In other embodiments, one or more post-flush fluids may be used after the introduction of the treatment fluids described herein. As used herein, the term "post-flush fluid" refers to a fluid stage introduced into a subterranean formation after the treatment fluid(s) described herein. The post-flush fluid may facilitate elimination of the removed acid-soluble material from the wellbore in the treatment fluid, removal of excess treatment fluid from the pore spaces in the subterranean formation or elsewhere in the formation, enhancement of post-treatment permeability, and the like. One or more pre-flush and/or post-flush fluids may be used in accordance with the embodiments described herein, without departing from the scope of the present disclosure and each may have the same or different type of base fluid.

Suitable examples of pre-flush and/or post-flush fluids for use in the embodiments described herein may include, but are not limited to any of the aqueous base fluids described previously for inclusion in the treatment fluids herein, solvent base fluids, a surfactant base fluid, a hydrocarbon base fluid, gas base fluids, foamed base fluids, and any combination thereof.

The solvent base pre-flush and/or post-flush fluids may comprise a glycol ether solvent (e.g., diethylene glycol monomethyl ether, diethylene glycol dimethyl ether, ethylene glycol monobutyl ether, diethylene glycol monobutyl ether, dipropylene glycol monomethyl ether, dipropylene glycol dimethyl ether, ethyleneglycol butyl ether, 2-butoxy ethanol, and the like), butyl lactate, dimethyl formamide, propylene carbonate, methanol, isopropanol, butyl alcohol, d'limonene, a fatty acid methyl ester, butylglycidyl ether, an ether of a C2 to C6 dihydric alkanol containing at least one C1 to C6 alkyl group, a mono ether of dihydric alkanol, methoxypropanol, butoxyethanol, hexoxyethanol, any isomers thereof, and any combination thereof.

Suitable surfactant base fluids may be one or more of the following, but not necessarily limited to, anionic surfactants, nonionic surfactants, cationic surfactants, amphoteric surfactants and derivatives of such, namely surfactants containing a non-ionic spacer as a central extension and an ionic or nonionic polar group. Other suitable surfactants for use as the surfactant base fluid are dimeric or gemini surfactants, cleavable surfactants, and fluorinated surfactants. The surfactant base fluids may include, but are not limited to, monomeric cationic and monomeric amphoteric types. Anionic surfactants may include, but are not limited to, alkali metal alkyl sulfates, alkyl ether sulfonates, alkyl sulfonates, alkylaryl sulfonates, linear and branched alkyl ether sulfates and sulfonates, alcohol polypropoxylated sulfates, alcohol polyethoxylated sulfates, alcohol polypropoxylated polyethoxylated sulfates, alkyl disulfonates, alkylaryl disulfonates, alkyl disulfates, alkyl sulfosuccinates, alkyl ether sulfates, linear and branched ether sulfates, alkali metal carboxylates, fatty acid carboxylates, dodecyl sodium sulfate, dodecyl ammonium sulfate, sodium laureth sulfate, ammonium laureth sulfate, sodium lauryl sulfate, ammonium lauryl sulfate, sodium alpha-sulfo methyl laurate, disodium alpha-sulfo laurate, alpha-sulfo methyl cocoate, disodium alpha-sulfo cocoate, dodecylbenzene sulfonic acid, dodecylbenzene sulfonate salts, and any combination thereof. Nonionic surfactants may include, but are not limited to, amides, diamides, polyglycol esters, alkyl polyglycosides, sorbitan esters, methyl glucoside esters, alcohol ethoxylates, and any combination thereof. Cationic surfactants may include, but are not limited to, arginine methyl esters, alkanolamines, alkylenediamines, and any combination thereof. Additional suitable surfactants may contain a non-ionic spacer-arm central extension and an ionic or nonionic polar group, wherein the non-ionic spacer-arm central extension results from polypropoxylation, polyethoxylation, or both. Other suitable surfactants may include, but are not limited to, an alkyl phosphonate surfactant (e.g., a C12-C22 alkyl phosphonate surfactant), an ethoxylated nonyl phenol phosphate ester, alkoxylated fatty acids, alkylphenol alkoxylates, ethoxylated alkyl amines, and any combination thereof. In some embodiments, combinations of one or more cationic and nonionic surfactants also may be suitable.

Suitable hydrocarbon base fluids for use as the pre-flush or post-flush fluids of the present disclosure may include, but are not limited to, alkanes, branched alkanes, olefins, aromatic organic compounds, cyclic alkanes, paraffins, diesel fluids, mineral oils, desulfurized hydrogenated kerosenes, and any combination thereof.

Suitable gases for forming a gas base fluid pre-flush according to the methods described herein may include, but are not limited to, nitrogen, carbon dioxide, air, methane, helium, argon, and any combination thereof. A foam base fluid may be formed by combining these gases with any of the non-gaseous base fluids described herein (e.g., aqueous base fluids, solvent base fluids, surfactant base fluids, hydrocarbon base fluids, and any combination thereof) and, in some instances, an additional foaming agent. Suitable such foaming agents may include, but are not limited to, surfactants like betaines, sulfated or sulfonated alkoxylates, alkyl quaternary amines, alkoxylated linear alcohols, alkyl sulfonates, alkyl aryl sulfonates, C10-C20 alkyldiphenyl ether sulfonates, polyethylene glycols, ethers of alkylated phenol, sodium dodecylsulfate, alpha olefin sulfonates, such as sodium dodecane sulfonate, trimethyl hexadecyl ammonium bromide, and the like, any derivative thereof, or any combination thereof.

Any additives disclosed above may additionally be included in one or more of the pre-flush and/or post-flush fluids employed according to the embodiments described herein, without departing from the scope of the present disclosure.

The amount of pre-flush and/or post-flush fluids used may depend on a number of factors including, but not limited to, the temperature of the formation being treated, the pressure applied to the flush fluid, the amount of debris to be removed from the formation prior to introducing the treatment fluid, the amount of fluids to be displaced from the formation prior to introducing the treatment fluid, the amount of solubilized acid-soluble material(s) for elimination from the subterranean formation, the amount of residual treatment fluid to be removed from the subterranean formation, and the like.

The pre-flush, treatment, and post-flush fluids (collectively referred to below as simply "fluids") of the present disclosure may be prepared by any method suitable for performing the subterranean formation operations described herein. For example, certain components of the fluids may be provided in a pre-blended powder, solid, or liquid form, which may be combined to form the complete fluids of the present disclosure at a subsequent time. In some embodiments, the fluids of the present disclosure may be bullheaded into the well (i.e., pumped into the wellbore without the use of isolation tools or barrier devices) or placed using coiled tubing or jointed pipe to treat specific intervals of interest in a subterranean formation. In some embodiments, a pressure pulsing or rotating hydrojetting tool may be coupled with the coiled tubing or jointed pipe to aid in placement of the fluids in the subterranean formation.

In various embodiments, systems configured for delivering the fluids described herein (i.e., the pre-flush, treatment, and post-flush fluids) to a downhole location are described. In various embodiments, the systems can comprise a pump fluidly coupled to a tubular, the tubular containing the fluids described herein. It will be appreciated that while the system described below may be used for delivering either or each of the pre-flush, treatment, and post-flush fluid, each fluid is delivered separately into the subterranean formation.

The pump may be a high pressure pump in some embodiments. As used herein, the term "high pressure pump" will refer to a pump that is capable of delivering a fluid downhole at a pressure of about 1000 psi or greater. A high pressure pump may be used when it is desired to introduce the treatment fluids to a subterranean formation at or above a fracture gradient of the subterranean formation, but it may also be used in cases where fracturing is not desired. In some embodiments, the high pressure pump may be capable of fluidly conveying particulate matter, such as the micro-sized proppant particulates and/or the micro-sized proppant particulates described in some embodiments herein, into the subterranean formation. Suitable high pressure pumps will be known to one having ordinary skill in the art and may include, but are not limited to, floating piston pumps and positive displacement pumps.

In other embodiments, the pump may be a low pressure pump. As used herein, the term "low pressure pump" will refer to a pump that operates at a pressure of about 1000 psi or less. In some embodiments, a low pressure pump may be fluidly coupled to a high pressure pump that is fluidly coupled to the tubular. That is, in such embodiments, the low pressure pump may be configured to convey the treatment fluids to the high pressure pump. In such embodiments, the low pressure pump may "step up" the pressure of the treatment fluids before reaching the high pressure pump.

In some embodiments, the systems described herein can further comprise a mixing tank that is upstream of the pump and in which the treatment fluids are formulated. In various embodiments, the pump (e.g., a low pressure pump, a high pressure pump, or a combination thereof) may convey the treatment fluids from the mixing tank or other source of the treatment fluids to the tubular. In other embodiments, however, the treatment fluids may be formulated offsite and transported to a worksite, in which case the treatment fluid may be introduced to the tubular via the pump directly from its shipping container (e.g., a truck, a railcar, a barge, or the like) or from a transport pipeline. In either case, the treatment fluids may be drawn into the pump, elevated to an appropriate pressure, and then introduced into the tubular for delivery downhole.

Figure 1:
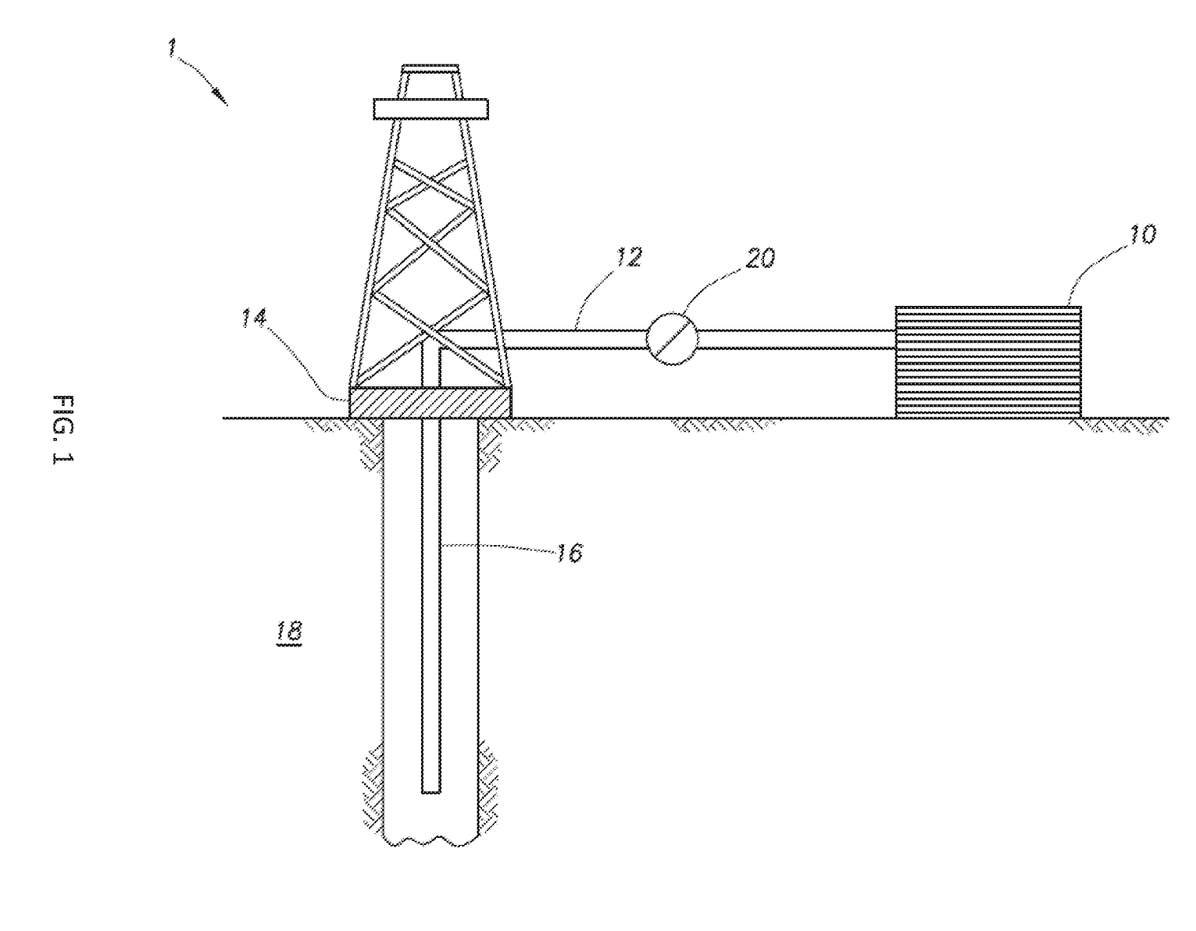
FIG. 1 depicts an embodiment of a system configured for delivering various treatment fluids of the embodiments described herein to a downhole location.

FIG. 1 shows an illustrative schematic of a system that can deliver the treatment fluids of the present disclosure to a downhole location, according to one or more embodiments. It should be noted that while FIG. 1 generally depicts a land-based system, it is to be recognized that like systems may be operated in subsea locations as well. As depicted in FIG. 1, system 1 may include mixing tank 10, in which the fluids of the embodiments herein may be formulated. The fluids may be conveyed via line 12 to wellhead 14, where the fluids enter tubular 16, tubular 16 extending from wellhead 14 into subterranean formation 18. Upon being ejected from tubular 16, the fluids may subsequently penetrate into subterranean formation 18. Pump 20 may be configured to raise the pressure of the fluids to a desired degree before introduction into tubular 16. It is to be recognized that system 1 is merely exemplary in nature and various additional components may be present that have not necessarily been depicted in FIG. 1 in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

Although not depicted in FIG. 1, the fluid may, in some embodiments, flow back to wellhead 14 and exit subterranean formation 18. In some embodiments, the fluid that has flowed back to wellhead 14 may subsequently be recovered and recirculated to subterranean formation 18.

It is also to be recognized that the disclosed fluids may also directly or indirectly affect the various downhole equipment and tools that may come into contact with the fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIG. 1.

Embodiments disclosed herein include:

Embodiment A

A method comprising: introducing a treatment fluid into a wellbore in a subterranean formation comprising acid-soluble material at a first treatment interval, wherein the treatment fluid comprises methane sulfonic acid (MSA) and fully protonated N-(phosphonomethyl)iminodiacetic acid (PMIDA) at least partially solubilized in the MSA; and reacting the MSA and the PMIDA in the treatment fluid with the acid-soluble material at a temperature in the range of about 65° C. to about 210° C., wherein the reacting removes the acid-soluble material, thereby forming conductive channels in the subterranean formation.

Embodiment A may have one or more of the following additional elements in any combination:

Element A1: Wherein an initial pH of the treatment fluid is less than about 1.9.

Element A2: Wherein the MSA reacts with the acid-soluble material before the PMIDA reacts with the acid-soluble material, and the PMIDA does not react with the acid-soluble material until the MSA has spent sufficiently to cause the pH of the treatment fluid to rise to greater than about 2.0.

Element A3: Wherein the PMIDA reacts with the acid-soluble material in a far-field region of the subterranean formation away from a face of the wellbore as compared to the MSA.

Element A4: Wherein the acid-soluble material is a carbonate material, scale, a sulfate material, an iron oxide, a manganese oxide, and any combination thereof.

Element A5: Wherein the PMIDA is present in the treatment fluid in a ratio to the MSA (PMIDA:MSA) in an amount in the range of about 1:5 to about 45:80.

Element A6: Wherein the treatment fluid further comprises an aqueous base fluid in an amount in the range of 0.2% to about 30% by volume of the MSA.

Element A7: Wherein the treatment fluid further comprises an additive selected from the group consisting of a weighting agent, an inert solid, a fluid loss control agent, a salt, an emulsifier, a dispersion aid, a corrosion inhibitor, an emulsion thinner, an emulsion thickener, a viscosifying agent, a gelling agent, a surfactant, a particulate, a proppant, a gravel particulate, a lost circulation material, a foaming agent, a gas, a pH control additive, a breaker, a biocide, a crosslinker, a stabilizer, a chelating agent, a scale inhibitor, a gas hydrate inhibitor, a mutual solvent, an oxidizer, a reducer, a friction reducer, a clay stabilizing agent, silica scale control additive, a gel stabilizer, an anti-oxidant, a polymer degradation prevention additive, a relative permeability modifier, a defoaming agent, an antifoaming agent, an iron control agent, a particulate diverter, an acid, a catalyst, a flocculant, a scavenger, a lubricant, a bridging agent, a solubilizer, a consolidating agent, a bactericide, and the like, and any combination thereof.

Element A8: Wherein the treatment fluid is introduced into the wellbore in the subterranean formation at a rate and pressure sufficient to create or enhance a fracture therein, and wherein the step of reacting the MSA and the PMIDA with the acid-soluble material includes reacting with acid-soluble material on a face of the fracture.

Element A9: Further comprising introducing a pre-flush fluid into the wellbore in the subterranean formation prior to the step of introducing the treatment fluid therein.

Element A10: Further comprising introducing a post-flush fluid into the wellbore in the subterranean formation after the step of reacting the MSA and the PMIDA with the acid-soluble material.

By way of non-limiting example, exemplary combinations applicable to A include: A with A1, A3, and A10; A with A2, A4, A6, and A9; A with A1, A2, A3, A4, A5, A6, A7, A8, A9, and A10; A with A3, A5, and A8; A with A7 and A8; A with A5, A9, and A10; A with A2 and A10; and the like.

Embodiment B

A system comprising: a tubular extending into a wellbore in a subterranean formation comprising acid-soluble material; and a pump fluidly coupled to the tubular, the tubular containing a treatment fluid comprising: methane sulfonic acid (MSA) and fully protonated N-(phosphonomethyl)iminodiacetic acid (PMIDA) at least partially solubilized in the MSA, the treatment fluid at a temperature in the range of about 65° C. to about 210° C.

Embodiment B may have one or more of the following additional elements in any combination:

Element B1: Wherein an initial pH of the treatment fluid is less than about 1.9.

Element B2: Wherein the acid-soluble material is a carbonate material, scale, a sulfate material, an iron oxide, a manganese oxide, and any combination thereof.

Element B3: Wherein the PMIDA is present in the treatment fluid in a ratio to the MSA (PMIDA:MSA) in an amount in the range of about 1:5 to about 45:80.

Element B4: Wherein the treatment fluid further comprises an aqueous base fluid in an amount in the range of 0.2% to about 30% by volume of the MSA.

Element B5: Wherein the treatment fluid further comprises an additive selected from the group consisting of a weighting agent, an inert solid, a fluid loss control agent, a salt, an emulsifier, a dispersion aid, a corrosion inhibitor, an emulsion thinner, an emulsion thickener, a viscosifying agent, a gelling agent, a surfactant, a particulate, a proppant, a gravel particulate, a lost circulation material, a foaming agent, a gas, a pH control additive, a breaker, a biocide, a crosslinker, a stabilizer, a chelating agent, a scale inhibitor, a gas hydrate inhibitor, a mutual solvent, an oxidizer, a reducer, a friction reducer, a clay stabilizing agent, silica scale control additive, a gel stabilizer, an anti-oxidant, a polymer degradation prevention additive, a relative permeability modifier, a defoaming agent, an antifoaming agent, an iron control agent, a particulate diverter, an acid, a catalyst, a flocculant, a scavenger, a lubricant, a bridging agent, a solubilizer, a consolidating agent, a bactericide, and the like, and any combination thereof.

By way of non-limiting example, exemplary combinations applicable to B include: B with B1 and B5; B with B2, B3, and B5; B with B2 and B4; B with B1, B2, B3, B4, and B5; B with B1, B2, and B4; and the like.

Embodiment C

A treatment fluid comprising: methane sulfonic acid (MSA) and fully protonated N-(phosphonomethyl)iminodiacetic acid (PMIDA) at least partially solubilized in the MSA, the treatment fluid having a temperature in the range of about 65° C. to about 210° C., wherein the PMIDA is present in the treatment fluid in a ratio to the MSA (PMIDA:MSA) in an amount in the range of about 1:5 to about 45:80.

Embodiment C may have one or more of the following additional elements in any combination:

Element C1: Wherein an initial pH of the treatment fluid is less than about 1.9.

Element C2: Wherein the treatment fluid further comprises an aqueous base fluid in an amount in the range of 0.2% to about 30% by volume of the MSA.

Element C3: Wherein the treatment fluid further comprises an additive selected from the group consisting of a weighting agent, an inert solid, a fluid loss control agent, a salt, an emulsifier, a dispersion aid, a corrosion inhibitor, an emulsion thinner, an emulsion thickener, a viscosifying agent, a gelling agent, a surfactant, a particulate, a proppant, a gravel particulate, a lost circulation material, a foaming agent, a gas, a pH control additive, a breaker, a biocide, a crosslinker, a stabilizer, a chelating agent, a scale inhibitor, a gas hydrate inhibitor, a mutual solvent, an oxidizer, a reducer, a friction reducer, a clay stabilizing agent, silica scale control additive, a gel stabilizer, an anti-oxidant, a polymer degradation prevention additive, a relative permeability modifier, a defoaming agent, an antifoaming agent, an iron control agent, a particulate diverter, an acid, a catalyst, a flocculant, a scavenger, a lubricant, a bridging agent, a solubilizer, a consolidating agent, a bactericide, and the like, and any combination thereof.

By way of non-limiting example, exemplary combinations applicable to C include: C with C1 and C2; C with C1 and C3; C with C1 and C4; C with C2 and C3; C with C2 and C4; C with C3 and C4; C1, C2, and C3; C with C1, C3, and C4; C with C1, C2, C3, and C4; and the like.

To facilitate a better understanding of the embodiments of the present disclosure, the following examples of representative embodiments are given. In no way should the following examples be read to limit, or to define, the scope of the invention.

Example 1

Prior experimental testing required inclusion of PMIDA in a media such as gels, where it was suspended and thus the transport media was in the form of a suspended solid, where upon heating the PMIDA would go into solution. The substantially reduced solubility profile of PMIDA thus has proven challenging at effective transport without significant complexity, costs, and ineffective transport errors. In this example, the ability of MSA to serve as a transport media for PMIDA was evaluated.

A coreflood experiment was setup including a core holder housing a rubber Hassler sleeve with an inside diameter of 2.54 centimeters (1 inch (in)). The coreflood testing was performed with a radially confining stress of 1,800 pounds per square inch (psi) and a backpressure of 1,000 psi. The flow rate was set to 2 milliliters per minute (mL/min) and the temperatures tested were 51.7° C. (125° F.) and 176.7° C. (350° F.).

A 2.54 cm×10.16 cm (1 in×4 in) core (98% calcite) was inserted into the sleeve and heated to one of the testing temperatures. A brine pre-flush fluid of 3% potassium chloride (KCl) in fresh water was flowed through the core to establish the initial permeability (units: millidarcy (mD)) of the core. After a stable permeability was reached, a treatment fluid was flowed through the core. The treatment fluid was prepared using 20 grams (g) of PMIDA in 300 mL of MSA. Injection of the treatment fluid was continued until breakthrough was achieved, as represented by an increase in permeability. Thereafter, a brine post-flush fluid of 3% KCl in fresh water was flowed through the core to establish a final permeability of the core.

Figure 2:
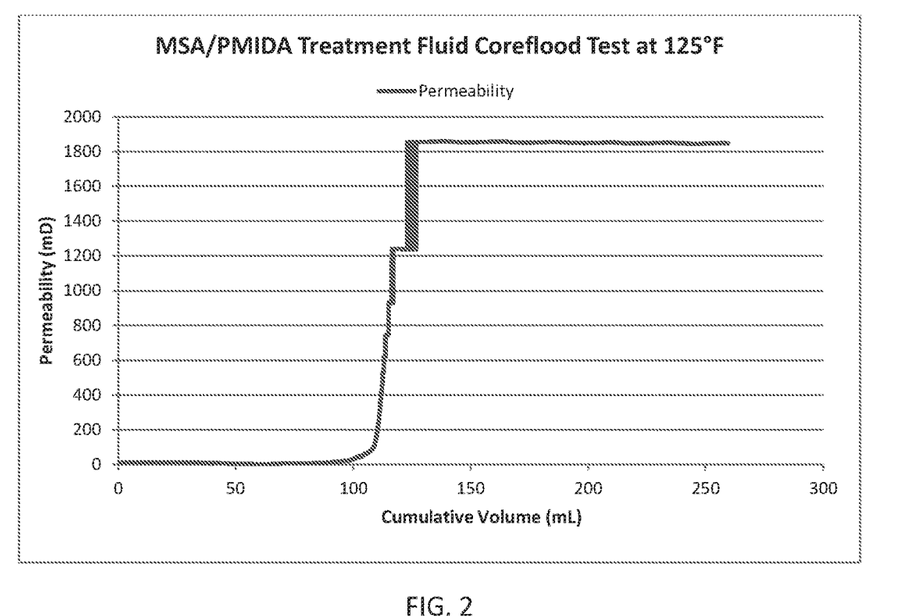
FIG. 2 depicts the permeability profile of the treatment fluid coreflood test at 51.7° C. (125° F.) according to one or more embodiments of the present disclosure.
Figure 3:
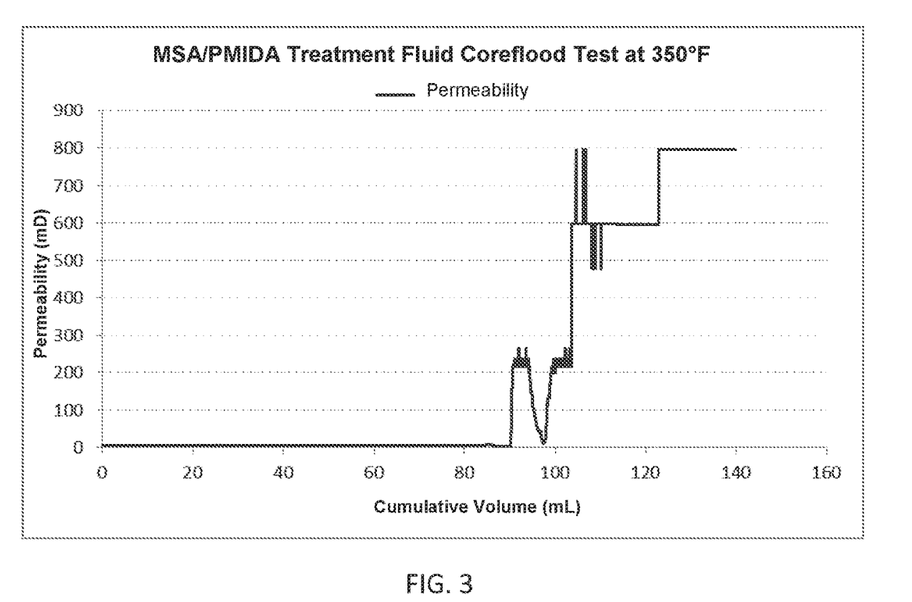
FIG. 3 depicts the permeability profile of the treatment fluid coreflood test at 176.7° C. (350° F.) according to one or more embodiments of the present disclosure.

FIG. 2 shows the permeability profile of the treatment fluid coreflood test at 51.7° C. (125° F.), and FIG. 3 shows the permeability profile of the treatment fluid coreflood test at 176.7° C. (350° F.).

In FIG. 2, showing the permeability profile at 51.7° C. (125° F.), the treatment fluid was flowed through the core between the cumulative volumes of about 85 mL to about 125 mL, at which point the post-flush fluid was introduced. In FIG. 3, showing the permeability profile at 176.7° C. (350° F.), the treatment fluid was flowed through the core between the cumulative volumes of about 86 mL to about 106 mL, at which point the post-flush fluid was introduced.

As shown in FIGS. 2 and 3, the initial permeability of the core was 6.4 mD, but upon flowing the treatment fluid, the permeability jumped dramatically due to generation of a wormhole, and retained high permeabilities after flowing the post-flush fluids. The permeability of the lower temperature coreflood tested core was similar to the high temperature test and showed a pre-treatment brine permeability of 6.0 mD.

Therefore, the embodiments disclosed herein are well adapted to attain the ends and advantages mentioned as well as those that are inherent therein. The particular embodiments disclosed above are illustrative only, as they may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The embodiments illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

The invention claimed is:

1. A method comprising:
 introducing a treatment fluid into a wellbore in a subterranean formation comprising acid-soluble material at a first treatment interval,
 wherein the treatment fluid comprises methane sulfonic acid (MSA) and fully protonated N-(phosphonomethyl) iminodiacetic acid (PMIDA) at least partially solubilized in the MSA; and
 reacting the MSA and the PMIDA in the treatment fluid with the acid-soluble material at a temperature in the range of about 65° C. to about 210° C., wherein the reacting removes the acid-soluble material, thereby forming conductive channels in the subterranean formation.

2. The method of claim 1, wherein an initial pH of the treatment fluid is less than about 1.9.

3. The method of claim 1, wherein the MSA reacts with the acid-soluble material before the PMIDA reacts with the acid-soluble material, and the PMIDA does not react with the acid-soluble material until the MSA has spent sufficiently to cause the pH of the treatment fluid to rise to greater than about 2.0.

4. The method of claim 1, wherein the PMIDA reacts with the acid-soluble material in a far-field region of the subterranean formation away from a face of the wellbore as compared to the MSA.

5. The method of claim 1, wherein the acid-soluble material is a carbonate material, scale, a sulfate material, an iron oxide, a manganese oxide, and any combination thereof.

6. The method of claim 1, wherein the PMIDA is present in the treatment fluid in a ratio to the MSA (PMIDA:MSA) in an amount in the range of about 1:5 to about 45:80.

7. The method of claim 1, wherein the treatment fluid further comprises an aqueous base fluid in an amount in the range of 0.2% to about 30% by volume of the MSA.

8. The method of claim 1, wherein the treatment fluid further comprises an additive selected from the group consisting of a weighting agent, an inert solid, a fluid loss control agent, a salt, an emulsifier, a dispersion aid, a corrosion inhibitor, an emulsion thinner, an emulsion thickener, a viscosifying agent, a gelling agent, a surfactant, a particulate, a proppant, a gravel particulate, a lost circulation material, a foaming agent, a gas, a pH control additive, a breaker, a biocide, a crosslinker, a stabilizer, a chelating agent, a scale inhibitor, a gas hydrate inhibitor, a mutual solvent, an oxidizer, a reducer, a friction reducer, a clay stabilizing agent, silica scale control additive, a gel stabilizer, an anti-oxidant, a polymer degradation prevention additive, a relative permeability modifier, a defoaming agent, an antifoaming agent, an iron control agent, a particulate diverter, an acid, a catalyst, a flocculant, a scavenger, a lubricant, a bridging agent, a solubilizer, a consolidating agent, a bactericide, and the like, and any combination thereof.

9. The method of claim 1, wherein the treatment fluid is introduced into the wellbore in the subterranean formation at a rate and pressure sufficient to create or enhance a fracture therein, and wherein the step of reacting the MSA and the PMIDA with the acid-soluble material includes reacting with acid-soluble material on a face of the fracture.

10. The method of claim 1, further comprising introducing a pre-flush fluid into the wellbore in the subterranean formation prior to the step of introducing the treatment fluid therein.

11. The method of claim 1, further comprising introducing a post-flush fluid into the wellbore in the subterranean formation after the step of reacting the MSA and the PMIDA with the acid-soluble material.

12. A system comprising:
 a tubular extending into a wellbore in a subterranean formation comprising acid-soluble material; and
 a pump fluidly coupled to the tubular, the tubular containing a treatment fluid comprising:
 methane sulfonic acid (MSA) and fully protonated N-(phosphonomethyl)iminodiacetic acid (PMIDA) at least partially solubilized in the MSA, the treatment fluid at a temperature in the range of about 65° C. to about 210° C.

13. The system of claim 12, wherein the acid-soluble material is a carbonate material, scale, a sulfate material, an iron oxide, a manganese oxide, and any combination thereof.

14. The system of claim 12, wherein the PMIDA is present in the treatment fluid in a ratio to the MSA (PMIDA: MSA) in an amount in the range of about 1:5 to about 45:80.

15. The system of claim 12, wherein the treatment fluid further comprises an aqueous base fluid in an amount in the range of 0.2% to about 30% by volume of the MSA.

16. The system of claim 12, wherein the treatment fluid further comprises an additive selected from the group consisting of a weighting agent, an inert solid, a fluid loss control agent, a salt, an emulsifier, a dispersion aid, a corrosion inhibitor, an emulsion thinner, an emulsion thickener, a viscosifying agent, a gelling agent, a surfactant, a particulate, a proppant, a gravel particulate, a lost circulation material, a foaming agent, a gas, a pH control additive, a breaker, a biocide, a crosslinker, a stabilizer, a chelating agent, a scale inhibitor, a gas hydrate inhibitor, a mutual solvent, an oxidizer, a reducer, a friction reducer, a clay stabilizing agent, silica scale control additive, a gel stabilizer, an anti-oxidant, a polymer degradation prevention additive, a relative permeability modifier, a defoaming agent, an antifoaming agent, an iron control agent, a particulate diverter, an acid, a catalyst, a flocculant, a scavenger, a lubricant, a bridging agent, a solubilizer, a consolidating agent, a bactericide, and the like, and any combination thereof.

17. A method comprising:
introducing a treatment fluid into a wellbore in a subterranean formation comprising acid-soluble material at a first treatment interval,
wherein the treatment fluid comprises methane sulfonic acid (MSA) and fully protonated N-(phosphonomethyl) iminodiacetic acid (PMIDA) at least partially solubilized in the MSA, wherein the PMIDA is present in the treatment fluid in a ratio to the MSA (PMIDA:MSA) in an amount in the range of about 1:5 to about 45:80; and
reacting the MSA and the PMIDA in the treatment fluid with the acid-soluble material.

18. The method of claim 17, wherein an initial pH of the treatment fluid is less than about 1.9.

19. The method of claim 17, wherein the treatment fluid further comprises an aqueous base fluid in an amount in the range of 0.2% to about 30% by volume of the MSA.

20. The method of claim 17, wherein the treatment fluid further comprises an additive selected from the group consisting of a weighting agent, an inert solid, a fluid loss control agent, a salt, an emulsifier, a dispersion aid, a corrosion inhibitor, an emulsion thinner, an emulsion thickener, a viscosifying agent, a gelling agent, a surfactant, a particulate, a proppant, a gravel particulate, a lost circulation material, a foaming agent, a gas, a pH control additive, a breaker, a biocide, a crosslinker, a stabilizer, a chelating agent, a scale inhibitor, a gas hydrate inhibitor, a mutual solvent, an oxidizer, a reducer, a friction reducer, a clay stabilizing agent, silica scale control additive, a gel stabilizer, an anti-oxidant, a polymer degradation prevention additive, a relative permeability modifier, a defoaming agent, an antifoaming agent, an iron control agent, a particulate diverter, an acid, a catalyst, a flocculant, a scavenger, a lubricant, a bridging agent, a solubilizer, a consolidating agent, a bactericide, and the like, and any combination thereof.

* * * * *